United States Patent
Miyakawa et al.

(10) Patent No.: US 9,905,382 B2
(45) Date of Patent: Feb. 27, 2018

(54) SWAGING STRUCTURE

(71) Applicant: KABUSHIKI KAISHA SAGINOMIYA SEISAKUSHO, Tokyo (JP)

(72) Inventors: Satoshi Miyakawa, Tokorozawa (JP); Yoshihiro Hamabe, Sayama (JP)

(73) Assignee: KABUSHIKI KAISHA SAGINOMIYA SEISAKUSHO, Tokyo (JP)

( * ) Notice: Subject to any disclaimer, the term of this patent is extended or adjusted under 35 U.S.C. 154(b) by 0 days.

(21) Appl. No.: 15/039,324

(22) PCT Filed: Nov. 5, 2014

(86) PCT No.: PCT/JP2014/005578
§ 371 (c)(1),
(2) Date: May 25, 2016

(87) PCT Pub. No.: WO2015/097964
PCT Pub. Date: Jul. 2, 2015

(65) Prior Publication Data
US 2017/0169974 A1    Jun. 15, 2017

(30) Foreign Application Priority Data
Dec. 26, 2013    (JP) .................................. 2013-269109

(51) Int. Cl.
*H01R 43/048*    (2006.01)
*H01H 35/34*    (2006.01)
*F16B 17/00*    (2006.01)

(52) U.S. Cl.
CPC ........... *H01H 35/34* (2013.01); *F16B 17/004* (2013.01)

(58) Field of Classification Search
CPC .... H01R 3/04; H01R 43/048; H01R 43/0482; H01H 35/34; H01H 35/344
(Continued)

(56) References Cited

U.S. PATENT DOCUMENTS 3,967,369 A * 7/1976 Takano .............. H01H 11/0056
29/622
4,025,889 A * 5/1977 Schwarz .............. H01H 37/764
337/408

(Continued)

FOREIGN PATENT DOCUMENTS

JP    S62-182596    8/1987
JP    H2-135636    5/1990
(Continued)

OTHER PUBLICATIONS

International Preliminary Report on Patentability dated Jul. 7, 2016, issued in PCT Application No. PCT/JP2014/005578, filed Nov. 5, 2014.

*Primary Examiner* — Gary Paumen
(74) *Attorney, Agent, or Firm* — Workman Nydegger

(57) ABSTRACT

A swaging structure for which swaging process is easy, generation of wrinkles can be prevented, and which has high pressure-resistant performance is provided. In a swaging structure including at least a to-be-swaged member required to have airtightness to a surrounding environment and a swaging member constituted to retain the to-be-swaged member by a swaging processing, the swaging member has an annular side wall surrounding the to-be-swaged member, and a groove is formed in the annular side wall.

9 Claims, 13 Drawing Sheets

(58) Field of Classification Search
USPC ....... 200/83 R, 244, 537, 302.1, 16 A, 16 C, 200/526
See application file for complete search history.

(56) References Cited

U.S. PATENT DOCUMENTS

| | | | | |
|---|---|---|---|---|
| 4,319,106 | A * | 3/1982 | Armitage | H01H 13/58 200/526 |
| 4,384,569 | A * | 5/1983 | Clearman | F24J 2/16 126/617 |
| 4,563,551 | A * | 1/1986 | Black, III | H01H 11/06 200/16 C |
| 4,600,819 | A * | 7/1986 | Twyford | H01H 13/12 200/16 A |
| 5,512,724 | A * | 4/1996 | Binder | H01H 33/666 218/139 |
| 6,313,419 | B1 * | 11/2001 | Amore | H01H 35/343 200/302.1 |
| 6,329,622 | B1 * | 12/2001 | Ando | H01H 25/041 200/537 |
| 7,351,927 | B1 * | 4/2008 | Rakus | H01H 1/226 200/244 |
| 8,419,468 | B2 * | 4/2013 | Alrutz | H01R 13/622 439/321 |
| 8,556,232 | B2 * | 10/2013 | Oikawa | F16K 31/0613 251/129.01 |
| 8,641,012 | B2 * | 2/2014 | Matsumoto | A61M 39/045 137/625.41 |

FOREIGN PATENT DOCUMENTS

| | | |
|---|---|---|
| JP | H2-260331 | 10/1990 |
| JP | H10-104951 | 4/1998 |
| JP | H10-160383 | 6/1998 |
| JP | 2002-279875 | 9/2002 |
| JP | 2009-262203 | 11/2009 |

* cited by examiner

SWAGING STRUCTURE

TECHNICAL FIELD

The present invention relates to a swaging structure, particularly to a swaging structure suitable for a pressure switch for high pressure having a high pressure-resistant performance.

BACKGROUND ART

A prior-art pressure switch for high pressure such as a pressure switch for CO2 device and a pressure switch for construction machine mainly includes a switch case, a pressure response member and a holder as illustrated in Patent Literatures 1 and 2. The switch case has a contact portion opened/closed along with pressure detection of the pressure response member. The pressure response member includes a pressure sensing member such as a diaphragm, a rod for transmitting movement of the pressure sensing member to the contact portion of the switch case, and a pressure sensing chamber communicating with a pressure source via a pressure guide pipe. The holder integrally connects the switch case and the pressure response member by a swaging processing, and retains them. In this type of the pressure switch, extremely high pressure-resistant performance is required particularly in retaining of the pressure response member exposed to high pressure. In order to ensure high pressure-resistant performance, an increase of a thickness of an annular side wall of the holder that retains the pressure response member has been usually employed.

CITATION LIST

Patent Literature

PTL 1, Japanese Patent Laid-Open No. 2002-279875
PTL 2, Japanese Patent Laid-Open No. H02-135636 (1990)

SUMMARY OF THE INVENTION

The increase in the thickness of the annular side wall of the holder corresponding to the pressure response member in order to enhance the pressure-resistant performance requires a large swaging load, for example, in the case where the thick annular side wall is swaged by roller swaging, whereby a facility cost and a manufacturing space are increased. Furthermore, a die is quickly worn, which pushes up a manufacturing cost. Moreover, since the annular side wall is bent inward by the swaging processing, wrinkles are formed on a swaged portion of the annular side wall, whereby not only that the appearance is impaired but also there is a fear that quality lowering such as deterioration of dimensional accuracy, plating crack, and insufficient swaging is brought about.

An object of the present invention is, in view of the aforementioned problems, to provide a swaging structure for high pressure for which swaging is easy without requiring a large swaging load in the swaging processing and generation of wrinkles can be prevented, and which is excellent in pressure-resistant performance.

In order to achieve the object of the present invention, a swaging structure of the present invention includes at least a to-be-swaged member requiring airtightness with respect to a surrounding environment and a swaging member constituted so as to retain, by the swaging processing, the to-be-swaged member, wherein the swaging member has an annular side wall surrounding the to-be-swaged member, and a groove is formed in the annular side wall.

Furthermore, the groove formed in the annular side wall may be a groove formed in a plural number at a predetermined interval on an end portion of the annular side wall, by penetrating the annular side wall, or may be an annular groove formed in a plural number at the predetermined interval provided on an outer diameter side or on an inner diameter side of the annular side wall.

The swaging structure of the present invention includes a pressure response member having a diaphragm as a pressure sensing unit stored in a cover member and formed so as to communicate with a pressure source, a micro switch having a switch performing a switching operation by pressure sensing of the diaphragm, and a holder member retaining the pressure response member and the micro switch, wherein the holder member has a bulkhead and is formed so as to be able to retain the micro switch on one side while sandwiching the bulkhead and to retain, by the swaging processing, the pressure response member on the other side while sandwiching the bulkhead; and a lower annular side wall surrounding the pressure response member is formed on the other side of the bulkhead of the holder member retaining the pressure response member, and a plurality of grooves penetrating the lower annular side wall is formed from an inner side toward an outer side at predetermined intervals in an annular swaging portion retaining the pressure response member of the lower annular side wall.

Furthermore, the groove formed in a lower annular side wall of the holder member constituting the pressure switch may be formed so as to penetrate the lower annular side wall in a normal direction, or may be formed with an inclination with respect to the normal direction.

Moreover, the swaging structure according to the present invention may have a thin portion formed instead of the groove formed in the lower annular side wall of the holder constituting the pressure switch.

In the present invention, by providing the aforementioned configuration, a deformation margin at the time of plastic deformation of the swaging portion by swaging escapes to the groove, and thus resistance during swaging is small, swaging of the swaging portion can be performed with a low load, and wrinkles are hardly generated.

Furthermore, the formation of the groove makes a contact area of the swaging portion with a swaging tool smaller and reduces resistance in a circumferential direction, and thus a load acting on the swaging portion becomes larger even with the same swaging load, with the result that swaging with a low load becomes possible. In other words, a thicker swaging portion can be swaged with the same swaging load, which is advantageous in manufacturing a pressure switch for high pressure requiring a pressure-resistant structure.

Moreover, in the case where the swaging tool and the holder member are relatively rotated like a roller swaging, swaging with a lower load becomes possible by inclining the groove in accordance with a rotating direction.

In addition, since the pressure switch for high pressure according to the present invention is constituted so as to retain two members (the switch case and the pressure response member) with one holder member by swaging, the number of components may be small, structure is simple and manufacturing is easy, whereby a manufacturing cost can be kept low.

DESCRIPTION OF EMBODIMENTS

Hereinafter, a preferred embodiment of a pressure switch for high pressure to which a swaging structure according to the present invention is applied will be described by using FIGS. 1A to 10.

Figure 1A:
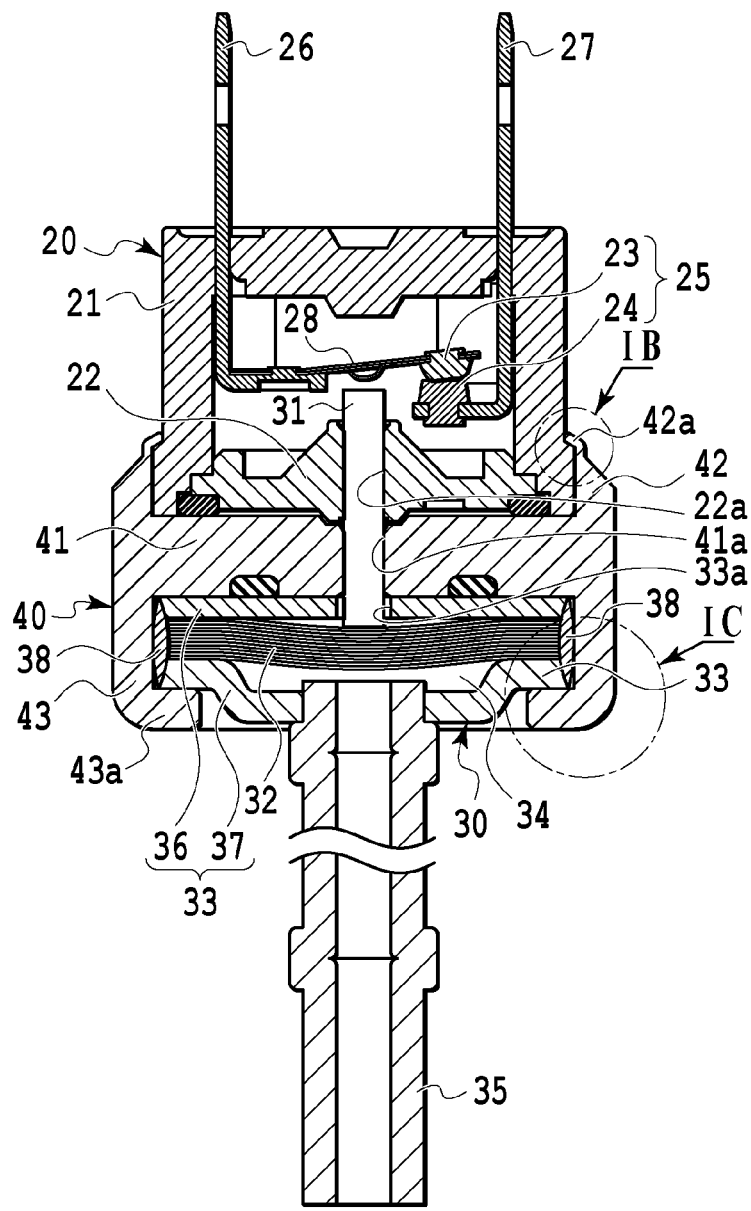
FIG. 1A is a cross-sectional view illustrating an entire pressure switch as an embodiment of a swaging structure according to the present invention.
Figure 1B:
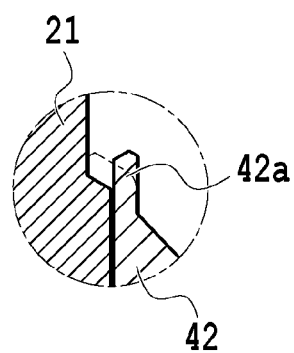
FIG. 1B is a partially enlarged cross-sectional view illustrating an inside of a circle IB in FIG. 1A.
Figure 1C:
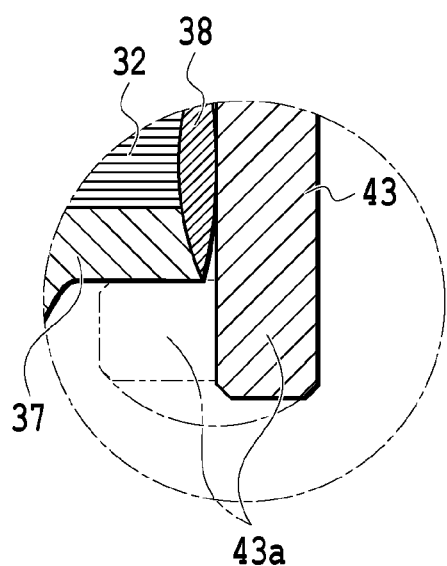
FIG. 1C is a partially enlarged cross-sectional view illustrating an inside of a circle IC in FIG. 1A.

A typical embodiment of the pressure switch 10 for high pressure according to the present invention is illustrated in FIGS. 1A to 1C. The pressure switch 10 according to the embodiment generally includes a micro switch 20, a pressure response member 30, and a holder member 40.

The micro switch 20 is made of an electrically-insulating synthetic resin, has a cylindrical switch case 21 and a guide plate 22, and is formed as a generally cylindrical housing with a bottom which is open upward in FIG. 1A. A switch 25 having a movable contact 23 and a fixed contact 24 is provided inside the housing of the micro switch 20. The movable contact 23 is connected to a first connection terminal 26 provided along the switch case 21 via a support arm 28 having elasticity, whereas the fixed contact 24 is directly connected to a second connection terminal 27 provided along the switch case 21 so as to face the first connection terminal 26. In the embodiment, the movable contact 23 and the fixed contact 24 are arranged so as to face each other in a vertical direction so that the both contacts 23 and 24 maintain a contact state at all times by the elasticity of the support arm 28 supporting the movable contact 23, and thus, so that the switch 25 maintains a closed state at all times. The support arm 28 is arranged so as to be capable of being in contact with an upper end of a shaft 31 constituting a pressure response member 30 which will be described later, and in FIG. 1A, the switch 25 can be opened by upward movement of the shaft 31. The shaft 31 is arranged vertically movably in a through-hole 22a formed in a guide plate 22 as a guide member in FIG. 1A. The switch 25 transmits an on/off signal of an electric current associated with opening/closing of the switch 25 to an electric circuit such as a control circuit connected via, for example, the first and second connection terminals 26 and 27. Note that the switch 25 is not limited to a normally-closed type as in the embodiment, but may be a normally-open type or may be such a type that one movable contact and two fixed contacts are provided, and the movable contact is switched from one of the fixed contacts to the other.

The pressure response member 30 is a member for turning on/off the switch 25 provided in the micro switch 20 by sensing of a pressure, and includes a cover member 33 having the shaft 31, a diaphragm 32, and a pressure sensing chamber 34, and a pressure guide pipe 35. The shaft 31 is arranged so as to transmit deformation (reversal) of the diaphragm 32 as pressure sensing unit to the support arm 28 and so as to be able to open/close the switch 25. The shaft 31 extends in the micro switch 20 through a through-hole 33a provided in an upper cover 36 constituting the cover member 33, a through-hole 41a provided in a bulkhead 41, and a through-hole 22a penetrating the guide plate 22, from the diaphragm 32 of the pressure response member 30 as illustrated in FIG. 1A. The shaft 31 has its length set so that, in the case where the shaft 31 moves upward, the upper end of the shaft 31 can be brought into contact with the support arm 28 having elasticity and a lower end of the shaft 31 can interlock with deformation of the diaphragm 32.

The diaphragm 32 as the pressure sensing unit is formed as a laminate body of metal thin plate in the embodiment, although the diaphragm 32 is not limiting. The diaphragm 32 is stored and retained in the cover member 33 so that an upper surface of the diaphragm 32 is brought into contact with the shaft 31 and a lower surface faces the pressure sensing chamber 34 which will be described later. The diaphragm 32 is preferably arranged so as to protrude toward the pressure sensing chamber 34 as illustrated in FIG. 1A. Accordingly, a deformation amount of the diaphragm 32 in the case where the pressure is sensed can be taken large, and opening/closing of the switch 25 is ensured.

The cover member 33 constituting the pressure response member 30 includes the upper cover 36 and a lower cover 37 in the embodiment, and the upper and lower covers 36 and 37 sandwich the diaphragm 32 between them, and are welded with the diaphragm 32 by a welding portion 38 and are fixed to each other. The pressure sensing chamber 34 communicating with the pressure source is formed between the lower cover 37 constituting the cover member 33 and the diaphragm 32. Therefore, the pressure sensing chamber 34 is defined by the diaphragm 32 and the lower cover 37 and requires airtightness with respect to a surrounding environment. In the upper cover 36 constituting the cover member 33, the through-hole 33a through which the shaft 31 interlocking with deformation of the diaphragm 32 passes is formed as described above. The pressure sensing chamber 34 formed in the cover member 33 communicates with the pressure source via the pressure guide pipe 35 previously joined to the lower cover 37 constituting the cover member 33 by brazing. Note that, in the embodiment, since the pressure sensing chamber 34 particularly communicates with the high-pressure pressure source, the diaphragm 32 needs to reliably keep airtightness of the pressure sensing chamber 34 with respect to the outside as described above. Therefore, as in the embodiment illustrated in FIG. 1A, it is preferably welded with the upper and lower covers 36 and 37 sandwiching the diaphragm 32 by the welding portion 38 and retained in the cover member 33.

In the case where the diaphragm 32 senses a pressure of a fluid in the pressure sensing chamber 34 and is deformed (reversed) by constituting the pressure response member 30 as above, the shaft 31 moves upward, and the upper end of the shaft 31 is brought into contact with the support arm 28 having elasticity and connected to the movable contact 23. Accordingly, the movable contact 23 is separated away from the fixed contact 24 and thus the switch 25 is opened.

The holder member 40 is made of metal and is a member for reliably retaining the pressure response member 30 requiring a pressure-resistant structure and for integrally retaining the pressure response member 30 and the micro switch 20. The holder member 40 in the embodiment is constituted so as to retain the two members or specifically, so as to be able to retain the micro switch 20 on an upper side and the pressure response member 30 on a lower side, by a swaging processing.

In the embodiment, the holder member 40 includes the bulkhead 41, an upper annular side wall 42 provided above the bulkhead 41 and a lower annular side wall 43 provided below the bulkhead 41. In the bulkhead 41, the through-hole 41a through which the shaft 31 of the pressure response member 30 passes is formed. Furthermore, the upper annular side wall 42 provided on the upper side which is one side of the bulkhead 41 includes, on its upper free end, a thin micro switch swaging portion 42a for retaining the micro switch 20 as a first to-be-swaged member. Moreover, the lower annular side wall 43 provided on the lower side which is the other side of the bulkhead 41 includes, on its lower free end, a thick pressure response member swaging portion 43a for retaining the pressure response member as a second to-be-swaged member.

In the case where the pressure switch 10 is to be assembled, the micro switch 20 which is the first to-be-swaged member is arranged on the bulkhead 41 of the holder member 40, and as a result, a lower outer periphery of the micro switch 20 is surrounded by the upper annular side wall 42. Subsequently, as illustrated in FIG. 1B, the thin micro switch swaging portion 42a at a free end of the upper annular side wall 42 is swaged to the lower outer periphery of the micro switch 20, and thus the micro switch 20 which is the first to-be-swaged member is fixed to the holder member 40.

Similarly, the pressure response member 30 as the second to-be-swaged member is arranged below the bulkhead 41 of the holder member 40 and the entire flat cover member 33 is surrounded by the lower annular side wall 43. Therefore, as illustrated in FIG. 1C, the thick pressure response member swaging portion 43a of the lower annular side wall 43 is swaged to the lower cover 37 of the cover member 33, and thus the pressure response member 30 which is the second to-be-swaged member is firmly fixed to the holder member 40. As can be understood from the description, in the embodiment, the holder member 40 can be considered to be a swaging member for retaining, by swaging, the micro switch 20 or the pressure response member 30 as the first or second to-be-swaged member. Therefore, in the embodiment, it can be said that the micro switch 20 or the pressure response member 30 and the holder member 40 constitute the swaging structure. Note that, in the embodiment, the micro switch 20 is assumed to be swaged to the holder member 40, but this is not limiting, and the micro switch 20 may be fixed to the holder member 40 by press-fitting or an adhesive material.

In the embodiment, improvements according to the present invention are applied to the lower annular side wall 43 of the holder member 40 in order that the holder member 40 can reliably retain the pressure response member 30 requiring pressure-resistant performance and that the swaging of the holder member 40 can be easily performed. Note that, in the embodiment, it is preferable that the thick pressure response member swaging portion 43a retaining the pressure response member 30 of the lower annular side wall 43 is plastically deformed by a roller and swaged. Furthermore, in the embodiment, the thickness of the pressure response member swage portion 43a is large, but if a pressure of the pressure source communicating with the pressure response member 30 as the to-be-swaged member is small, and thus the thickness may be small if required airtightness is small.

Figure 2:
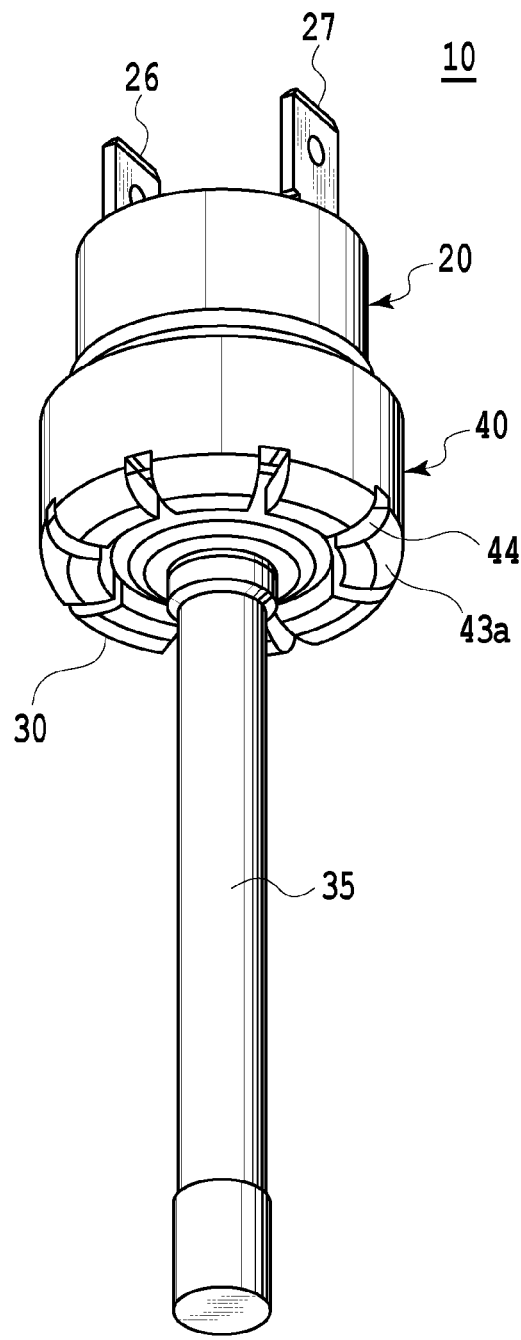
FIG. 2 is a perspective view illustrating the pressure switch of FIG. 1A.
Figure 3:
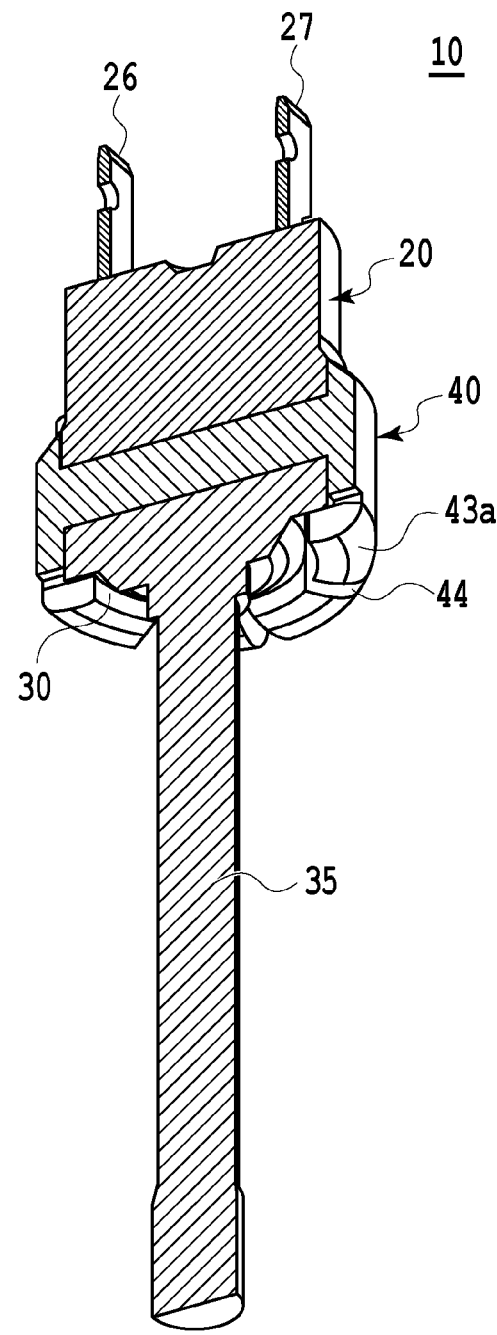
FIG. 3 is a cross-sectional perspective view illustrating the pressure switch of FIG. 1A.

In FIGS. 2 and 3, there is illustrated a first embodiment of the lower annular side wall 43 of the pressure switch to which the swaging structure according to the present invention is applied. As illustrated in FIGS. 2 and 3, in the thick swaging portion 43a located below the lower annular side wall 43 and deformed by swaging, a groove 44 penetrating the lower annular side wall 43 from an inner side in a radial direction toward an outer side (or from the outer side to the inner side) is formed in a state before the swaging. In the case where the swaging portion 43a is to be swaged by a roller as a swaging tool by forming the grooves 44 in a plural number at predetermined intervals as above, a deformation margin can escape into the grooves 44, and thus resistance of the swaging portion 43a during the swaging becomes small. Therefore, a swaging load applied to the swaging portion 43a by the roller may be made small, and the swaging can be easily and rapidly performed. In other words, in the case where machining is performed with the same swaging load, a wall thickness of the lower annular side wall 43 can be made larger than before, and thus the pressure response member 30 by the holder member 40 can be retained with a more pressure-resistant structure. Since the deformation margin can escape into the grooves 44, a probability of generation of wrinkles becomes small, whereby the appearance can be kept clean, the lower cover 37 of the cover member 33 can be firmly and uniformly pressed, and the pressure response member 30 requiring pressure-resistant performance can be reliably retained. Furthermore, since the grooves 44 are formed, a contact area with the swaging portion 43a with which the roller as the swaging tool is in contact becomes small, and thus a load applied to the swaging portion 43a becomes large, which is advantageous in retaining the pressure response member 30 requiring a pressure-resistant structure.

Figure 4:
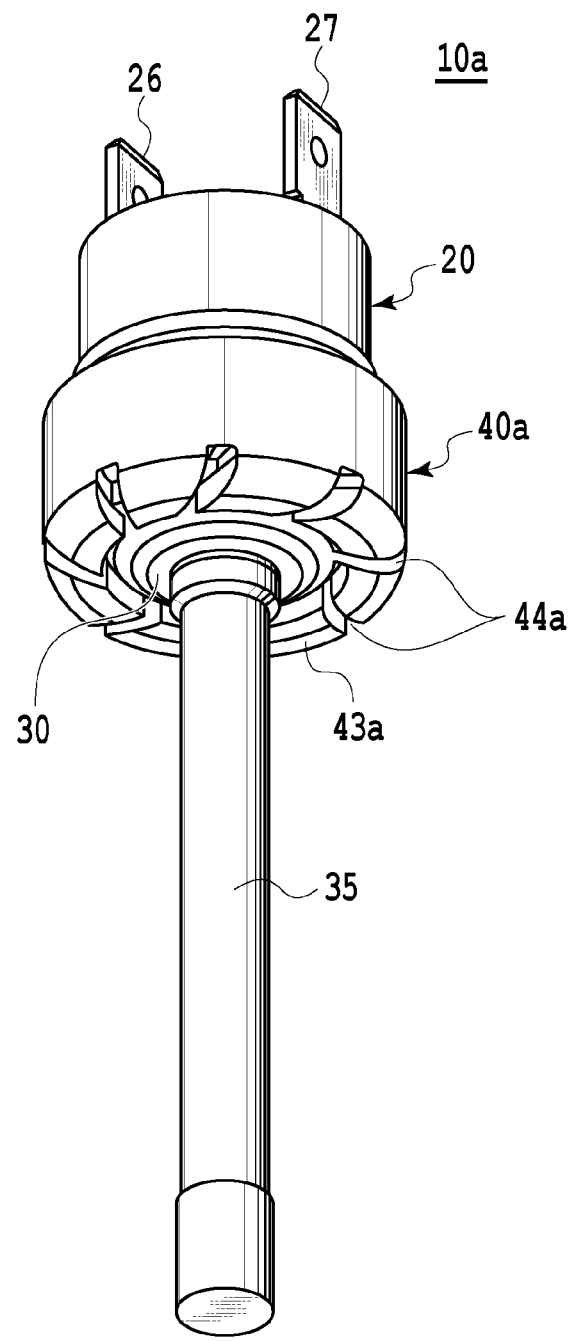
FIG. 4 is a perspective view illustrating another embodiment of a pressure switch as a swaging structure according to the present invention.
Figure 5:
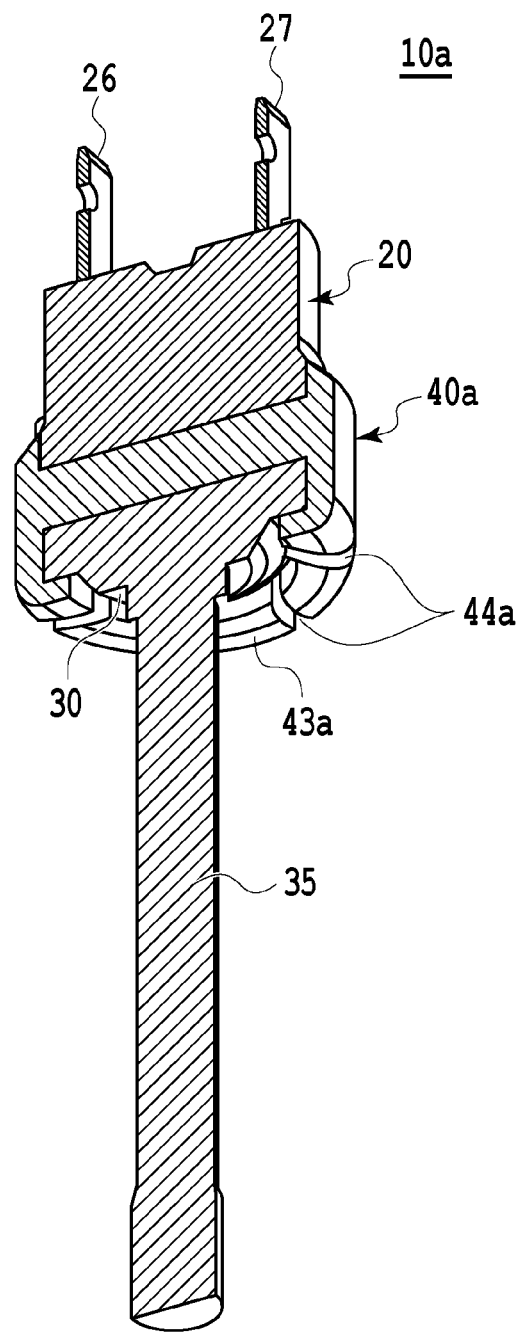
FIG. 5 is a cross-sectional perspective view illustrating the pressure switch of FIG. 4.

As to the formation of the grooves 44 featuring the present invention, the grooves 44 are formed so as to straightly penetrate the lower annular side wall 43 in the radial direction in the embodiment illustrated in FIGS. 2 and 3. However, the formation of the grooves 44 is not limited to such a structure, but grooves 44a may be formed so as to penetrate the lower annular side wall 43 of the holder member 40 in the pressure switch 10a with a slight inclination with respect to the radial direction as illustrated in FIGS. 4 and 5. By the formation of the grooves 44a as described above, in the case where the swaging tool is the roller and the roller, and the swaging portion 43a of the lower annular side wall 43 are relatively rotated, it will be understood that the swaging can be easily and rapidly performed by matching the inclination direction of the grooves 44 with the rotating direction.

Figure 6A:
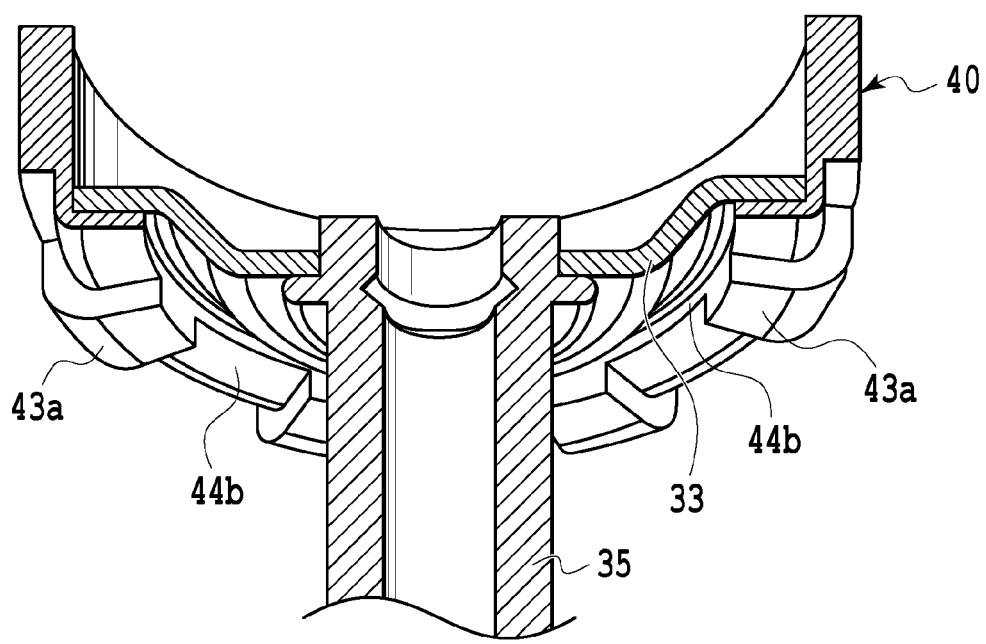
FIG. 6A is a partially cross-sectional perspective view illustrating a swaging structure of an externally-taken type, which is still another embodiment of the pressure switch as the swaging structure according to the present invention.
Figure 6B:
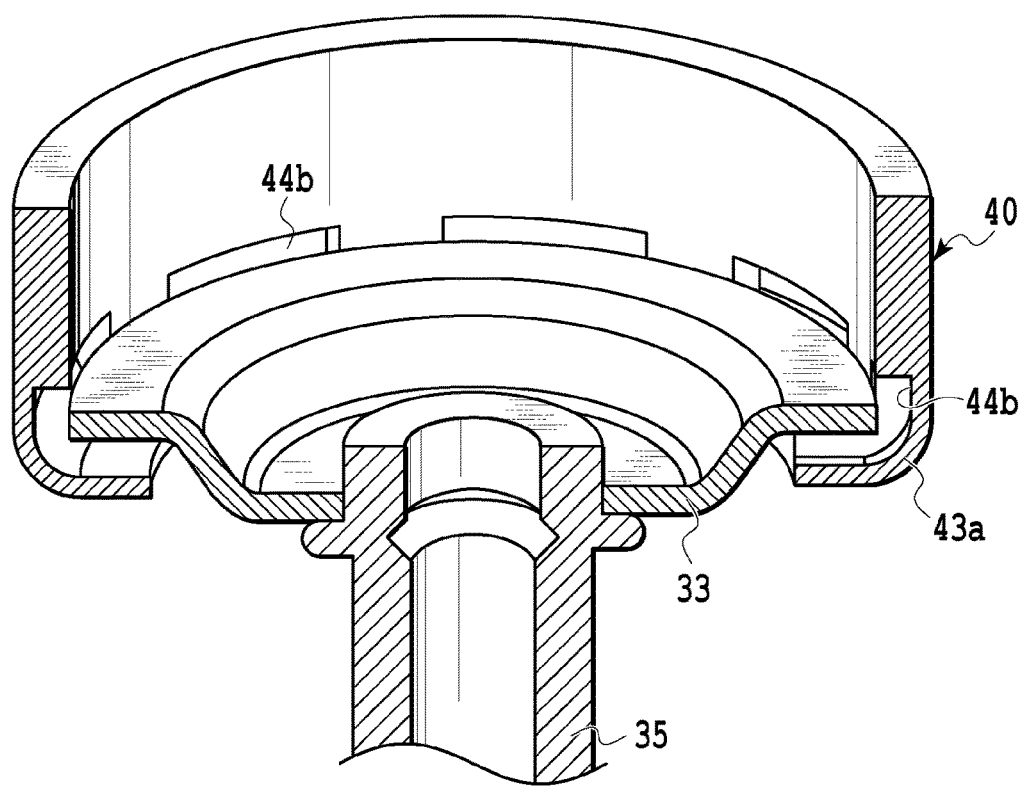
FIG. 6B is a partially cross-sectional perspective view illustrating a swaging structure of an internally-taken type, which is still another embodiment of the pressure switch as the swaging structure according to the present invention.

Furthermore, in the formation of the grooves 44 according to the present invention, the grooves 44 illustrated in FIGS. 2 and 3 may not penetrate the lower annular side wall 43 completely as illustrated in FIG. 6A or 6B. That is, as illustrated in FIG. 6A, the groove 44 may be formed as a thin portion 44b of an externally-taken type as if a part of the wall is cut away from the outer side of the lower annular side wall 43. Alternatively, as illustrated in FIG. 6B, the groove 44 may be formed as a thin portion 44b of an internally-taken type as if a part of the wall is cut away from the inner side of the lower annular side wall 43. Such thin portions 44b are also formed in a plural number at certain intervals in the lower annular side wall 43 as with the groove 44. Also by forming such thin portions 44b, the swaging can be easily and rapidly performed as with the holder member 40 in which the grooves 44 are formed, and the other working effects can be similarly expected.

Figure 7:
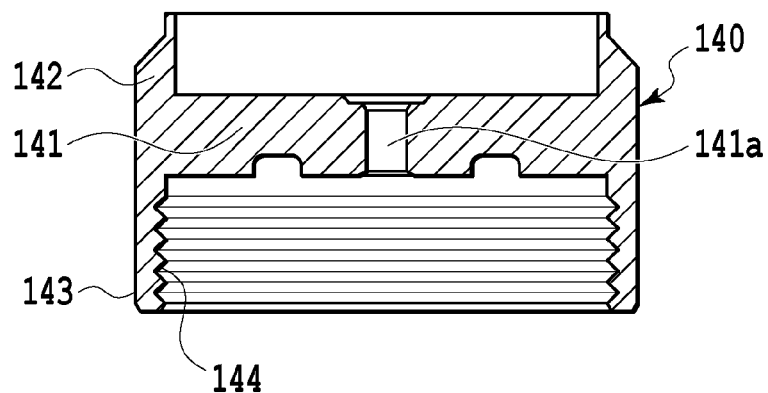
FIG. 7 is a cross-sectional view of a holder member of the pressure switch as still another embodiment of the swaging structure according to the present invention and the holder member having a plurality of annular grooves provided, each having a triangular section on an inner diameter side.
Figure 8:
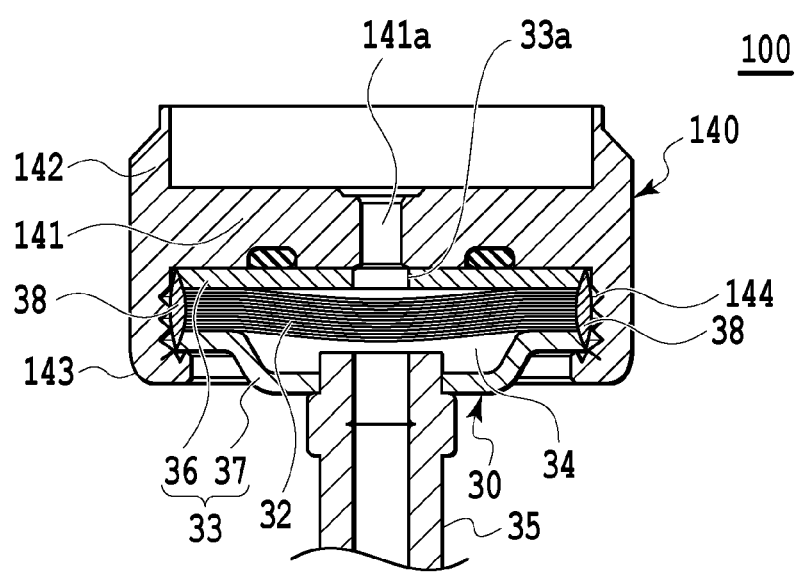
FIG. 8 is a cross-sectional view illustrating a state in which the swaging structure of the holder member illustrated in FIG. 7 is swaged.

Moreover, a plurality of annular grooves 144 each having a triangular section as a shape of the groove may be provided on the inner diameter side of a lower annular side wall 143, like a holder member 140 illustrated in FIG. 7. The pressure response member 30 can be easily and rapidly swaged by providing such a shape, as illustrated in FIG. 8. The annular groove 144 is machined by boring or the like using a lathe. Furthermore, a depth of the annular groove 144 is adjusted so that a thinnest portion of the lower annular side wall 143 matches a pressure of the swaging tool performing swaging.

In addition, even in the case of the generation of a change in component configuration of the pressure response member 30 which is the to-be-swaged member such as the change of the number of the diaphragms 32, or the generation of fluctuation, the annular groove 144 which is a bending fulcrum of the swaging is changed, by providing a plurality of the annular grooves 144, in accordance with the respective configurations, and thus the swaging can be easily performed without changing the holder member 140.

Figure 9:
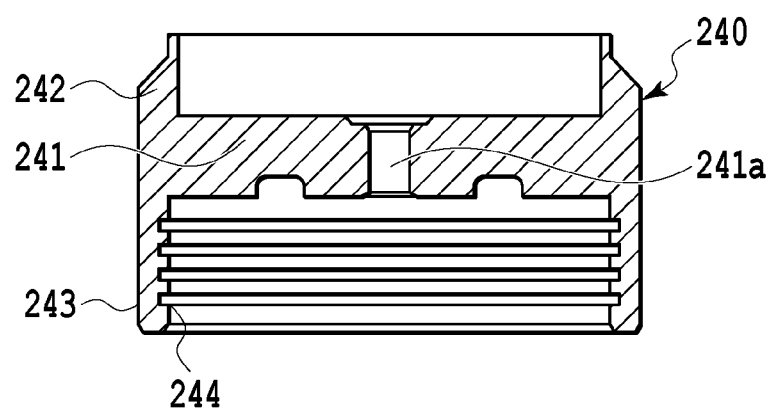
FIG. 9 is a cross-sectional view of a holder member of the pressure switch as still another embodiment of the swaging structure according to the present invention and the holder member having a plurality of annular grooves provided, each having a rectangular section on an inner diameter side.
Figure 10:
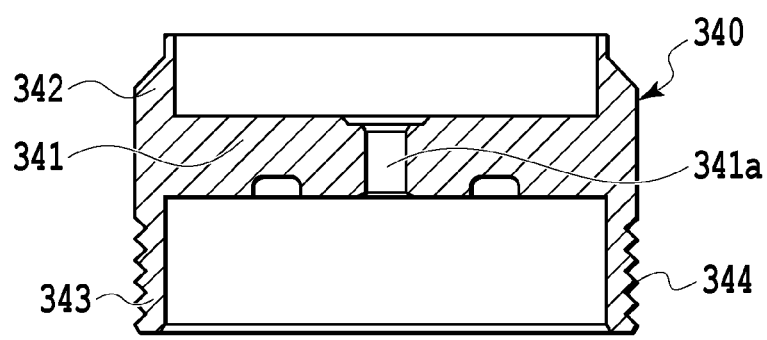
FIG. 10 is a cross-sectional view of a holder member of the pressure switch as still another embodiment of the swaging structure according to the present invention and the holder member having a plurality of annular grooves provided, each having a triangular section on an outer diameter side.

Furthermore, a plurality of annular grooves 244 each having a rectangular section may be provided on the inner diameter side of a lower annular side wall 243 as in a holder member 240 illustrated in FIG. 9, or a plurality of annular grooves 344 each having a triangular section may be provided on the outer diameter side of a thick lower annular side wall 343 as in a holder member 340 illustrated in FIG. 10. The formation of the annular grooves 244 and the annular grooves 344 as above also makes it possible to easily and rapidly perform the swaging in the same way as in the holder member 140 in which the aforementioned annular grooves 144 are formed, and the other working effects can be similarly expected.

Note that a cross-sectional shape of the annular groove formed on the inner diameter side or on the outer diameter side of the lower annular side wall 143 may be adapted to be any shape as long as the shape is used as a thread other than the shapes illustrated in FIGS. 7 to 10. For example, shapes of a triangular screw, a square screw, a trapezoidal screw, a lamp-based screw and the like can be applied. Furthermore, as illustrated in FIGS. 7 and 8, in the case where the cross-sectional shape is triangular, the cross-sectional shape is a shape having a fulcrum for bending, and in the case where the cross-sectional shape is rectangular as illustrated in FIG. 9, the cross-sectional shape is a shape in which stress does not concentrate too much and the fulcrum of the bending becomes a thin portion. An annular groove having a triangular cross-sectional shape as illustrated in FIGS. 7 and 8 is desirable from the viewpoint of ease of swaging, but this shape is not limiting. Furthermore, as in the embodiment, the annular grooves are preferably formed in parallel, but the grooves may be formed in a spiral shape as in a screw.

REFERENCE SIGNS LIST

10 pressure switch
20 micro switch
25 switch
30 pressure response member
32 diaphragm
33 cover member
34 pressure sensing chamber
35 pressure guide pipe
36 upper cover
37 lower cover
40 holder member
41 bulkhead
42 upper annular side wall
42a micro switch swaging portion
43 lower annular side wall
43a pressure response member swaging portion
44, 44a, 144, 244, 344 groove
44b thin portion

The invention claimed is:
1. A pressure switch comprising:
   a pressure response member having a diaphragm as a pressure sensing unit stored in a cover member and being formed to communicate with a pressure source,
   a micro switch having a switch for performing a switching operation based on the pressure sensing of the diaphragm, and
   a holder member for retaining the pressure response member and the micro switch, wherein:
   the holder member includes a bulkhead and is formed to retain the micro switch at a first side relative to the bulkhead and to retain the pressure response member by a swaging processing at a second side relative to the bulkhead; and
   the second side of the bulkhead of the holder member is configured to retain the pressure response member and has a lower annular side wall surrounding the pressure response member,
   wherein grooves formed in the lower annular side wall are annular grooves provided on an outer diameter side or an inner diameter side of the lower annular side wall, and formed in a plural number at predetermined intervals.
2. The pressure switch according to claim 1, wherein:
   the plurality of annular grooves of the lower annular side wall are formed on the inner diameter side of the lower annular side wall.
3. The pressure switch according to claim 1, wherein:
   the plurality of annular grooves of the lower annular side wall are formed on the outer diameter side of the lower annular side wall.
4. The pressure switch according to claim 1, wherein:
   the plurality of annular grooves of the lower annular side wall have a triangular section.
5. The pressure switch according to claim 1, wherein:
   the plurality of annular grooves of the lower annular side wall have a rectangular section.

6. A pressure switch comprising:

a pressure response member having a diaphragm as a pressure sensing unit stored in a cover member and being formed to communicate with a pressure source, a micro switch having a switch for performing a switching operation based on pressure sensing of the pressure response member, and a holder member for retaining the pressure response member and the micro switch, wherein:

the holder member includes a bulkhead and is formed to retain the micro switch at a first side relative to the bulkhead and to retain the pressure response member by a swaging processing at a second side relative to the bulkhead; and the second side of the bulkhead of the holder member is configured to retain the pressure response member and has a lower annular side wall surrounding the pressure response member, wherein the lower annular side wall includes a plurality of rectangular portions each having a thickness that is thinner than a thickness of the lower annular side wall, wherein the plurality of rectangular portions are formed at predetermined intervals.

7. The pressure switch according to claim 6, wherein:

the plurality of rectangular portions are formed on an inner peripheral side of the lower annular side wall.

8. The pressure switch according to claim 6, wherein:

the plurality of rectangular portions are formed on an outer peripheral side of the lower annular side wall.

9. A pressure switch comprising:

a pressure response member having a diaphragm as a pressure sensing unit stored in a cover member and being formed to communicate with a pressure source, a micro switch having a switch for performing a switching operation based on the pressure sensing of the diaphragm, and a holder member for retaining the pressure response member and the micro switch, wherein:

the holder member includes a bulkhead and is formed to retain the micro switch by a swaging processing at a first side relative to the bulkhead and to retain the pressure response member by a swaging processing at a second side relative to the bulkhead; and the second side of the bulkhead of the holder member is configured to retain the pressure response member and has a lower annular side wall surrounding the pressure response member, wherein the lower annular side wall includes and a plurality of grooves that are formed by penetrating the lower annular side wall at predetermined intervals wherein a thickness of the lower annular side is thicker than a thickness of an upper annular side that is retaining the micro switch at the first side of the bulkhead by a swaging processing.

* * * * *